US010182097B2

(12) United States Patent
Bovik et al.

(10) Patent No.: US 10,182,097 B2
(45) Date of Patent: Jan. 15, 2019

(54) PREDICTING A VIEWER'S QUALITY OF EXPERIENCE

(71) Applicant: Board of Regents, The University of Texas System, Austin, TX (US)

(72) Inventors: Alan Bovik, Austin, TX (US); Deepti Ghadiyaram, Austin, TX (US); Janice Pan, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 157 days.

(21) Appl. No.: 15/262,592

(22) Filed: Sep. 12, 2016

(65) Prior Publication Data

US 2017/0085617 A1    Mar. 23, 2017

Related U.S. Application Data

(60) Provisional application No. 62/222,352, filed on Sep. 23, 2015.

(51) Int. Cl.
*H04L 29/06* (2006.01)
*G06N 99/00* (2010.01)

(52) U.S. Cl.
CPC .......... *H04L 65/80* (2013.01); *H04L 65/4069* (2013.01); *G06N 99/005* (2013.01)

(58) Field of Classification Search
CPC .... H04L 65/80; H04L 65/4069; G06N 99/005
See application file for complete search history.

(56) References Cited

U.S. PATENT DOCUMENTS

2007/0254295 A1 * 11/2007 Harvey ................ C12Q 1/6886
                                                      435/6.18
2008/0310814 A1 * 12/2008 Bowra ............. H04N 21/23406
                                                      386/241
(Continued)

FOREIGN PATENT DOCUMENTS

WO    WO2013/029215 A1 *  8/2011
WO       2013029215 A1    3/2013

OTHER PUBLICATIONS

Muhammad A. Nizamuddin, Predistortion for Nonlinear Power Amplifiers With Memory, Dec. 6, 2002, pp. 1-91 (Year: 2002).*
(Continued)

*Primary Examiner* — Michael A Keller
*Assistant Examiner* — Javier O Guzman
(74) *Attorney, Agent, or Firm* — Robert A. Voigt, Jr.; Winstead, P.C.

(57) ABSTRACT

A method, system and computer program product for predicting a viewer's quality of experience while watching mobile videos potentially afflicted with network induced impairments. The length of a stall on a video at time t is received as a first input to a model. The number of stalls up to the time t is received as a second input to the model. Furthermore, the time since a preceding rebuffering event is received as a third input to the model. Additionally, a reciprocal stall density at time t is received as a fourth input to the model. The hysteresis effect is captured using a machine-learning-based model with an input that is an aggregate of the outputs of the first, second, third and fourth inputs to nonlinear input blocks of the model, where the hysteresis effect represents an effect that a viewer's recent level of satisfaction/dissatisfaction has on their overall viewing experience.

33 Claims, 5 Drawing Sheets

(56) References Cited

U.S. PATENT DOCUMENTS

| | | |
|---|---|---|
| 2010/0284471 A1 | 11/2010 | Tsai et al. |
| 2011/0211464 A1* | 9/2011 | Chetlur ............... H04L 41/5067 |
| | | 370/252 |
| 2012/0110167 A1* | 5/2012 | Joch ................... H04N 21/2401 |
| | | 709/224 |
| 2012/0137016 A1 | 5/2012 | Hsu et al. |
| 2012/0307654 A1* | 12/2012 | Pantos ..................... H04L 47/30 |
| | | 370/252 |
| 2014/0037205 A1 | 2/2014 | Su et al. |
| 2014/0185930 A1 | 7/2014 | Su et al. |
| 2015/0031965 A1 | 1/2015 | Visvanathan et al. |
| 2015/0110348 A1 | 4/2015 | Solanki et al. |
| 2015/0130952 A1 | 5/2015 | Wang et al. |
| 2016/0156520 A1* | 6/2016 | Scully ................... H04W 24/02 |
| | | 370/254 |

OTHER PUBLICATIONS

International Search Report and Written Opinion for International Application No. PCT/US16/51286 dated Dec. 5, 2016, pp. 1-9.
M. Nizamuddin, "Predistortion for Nonlinear Power Amplifiers with Memory," Thesis submitted to the faculty of Virginia Polytechnic Institute and State University, Dec. 6, 2002, pp. 1-91.
Ghadiyaram et al., "A Time-Varying Subjective Quality Model for Mobile Streaming Videos with Stalling Events," SPIE Conference on Applications of Digital Image Processing XXXVIII, San Diego, California, Aug. 10-13, 2015, pp. 1-8.
Hoβfeld et al., "Internet Video Delivery in YouTube: From Traffic Measurements to Quality of Experience," Data Traffic Monitoring and Analysis, Springer Berlin Heidelberg, 2013, pp. 264-301.
International Preliminary Report on Patentability for International Application No. PCT/US2016/051286 dated Mar. 27, 2018, pp. 1-7.

\* cited by examiner

Table 1: Median PLCC and Median SROCC across 50 train-test combinations on the LIVE-Avvasi Mobile Video Database-Phase I

|  | PLCC | SROCC |
|---|---|---|
| HW Model | 0.8908 ± 0.0434 | 0.8636 ± 0.0551 |
| DQS | 0.8639 ± 0.0571 | 0.8451 ± 0.0733 |
| FTW Model | 0.7734 ± 0.0645 | 0.8376 ± 0.0730 |

FIG. 7

PREDICTING A VIEWER'S QUALITY OF EXPERIENCE

TECHNICAL FIELD

The present invention relates generally to quality of experience (QoE) prediction models, and more particularly to predicting a viewer's quality of experience while watching mobile videos potentially afflicted with network induced impairments (e.g., stalls, rebuffering events).

BACKGROUND

By the end of 2014, video traffic accounted for 55% of total mobile data traffic and is projected to increase to 72% by 2019. Given the ubiquitous availability of portable mobile devices for image and video capture, there has been a dramatic shift towards over-the-top video streaming. On YouTube alone, half of the billions of daily video views are already on mobile devices. Due to limits on wireless network capacity, yet with an increasingly knowledgeable base of consumer users demanding better quality video display services, accounting for an end user's quality of experience (QoE) has become an essential measure of network performance. QoE refers to a viewer's holistic perception and satisfaction with a given communication network service.

Network impairments or bandwidth limitations can cause volatile network conditions, resulting in rebuffering or stalling events, which interrupt a video's playback. An example of a stalling event in a video is illustrated in FIG. 1, and various stalling events occurring intermittently in a video are illustrated in FIG. 2. Such network-induced stalling events can negatively impact a viewer's satisfaction with cellular network service quality and can lead to user attrition.

Designing an objective model that can accurately predict an end user's QoE can help cellular network providers better understand the effect of rebuffering events on viewer behavior. Such models can also assist in the reduction of network operational costs by encouraging the design and deployment of efficient "quality-aware" network solutions. These solutions can control and monitor the quality of streaming video content to help yield optimal user QoE. However, an end user's QoE is highly subjective and is the result of a combined effect produced by diverse, realistic stalling patterns, which occur at different locations and can be of varied frequencies and lengths on different types of video content. Therefore, designing a QoE model that accounts for such subjective factors but still correlates well with human opinion scores is highly challenging. Most of the existing models are designed on ad hoc video datasets and extract global stall-informative features, such as the sum of the lengths of all the stalls, number of stalls, and so on. These models may use simple learning engines to train a QoE predictor. However, the generalizability of these simple models becomes questionable with regards to their performance on other video datasets, which contain more diverse video content and more realistic stall patterns. The public unavailability of the details of many of these models and of the corresponding training data used poses additional challenges with respect to benchmarking these models on videos afflicted by realistic stalling patterns.

Another crucial disadvantage of all existing QoE prediction models designed based on global stall-informative features is the following: these models fail to capture the time-varying subjective quality of a viewer's opinion on a given video as it is being played and viewed. Aside from factors, such as the number and frequency of stalls and spatial and temporal distortions, QoE also depends on a behavioral hysteresis or recency "after effect," whereby an end user's QoE watching a video at a particular moment depends on the viewing experience before the moment. For example, a previous unpleasant viewing experience caused by a stalling event tends to penalize the QoE in the future and thus affects the overall QoE. A stalling event occurring towards the end of a video sequence has a more negative impact than a stall of the same length occurring at a different position in the same video sequence. This dependency on the previous viewing experience is often nonlinear in nature and can be crucial in determining the overall quality of experience of users, but it is not being captured by the state-of-the-art QoE prediction models.

SUMMARY

In one embodiment of the present invention, a method for predicting a viewer's quality of experience while watching mobile videos potentially afflicted with network induced impairments comprises receiving a length of a stall on a video at time t as a first input to a model. The method further comprises receiving a number of stalls up to the time t as a second input to the model. The method additionally comprises receiving a time since a preceding rebuffering event as a third input to the model. Furthermore, the method comprises receiving a reciprocal stall density at the time t as a fourth input to the model. Additionally, the method comprises capturing, by a processor, a hysteresis effect using a machine-learning-based model with an input that is an aggregate of the outputs of the first, second, third and fourth inputs to nonlinear input blocks of the model, where the hysteresis effect represents an effect that a viewer's recent level of satisfaction or dissatisfaction has on their overall viewing experience.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which:

FIG. 7 is a table, Table 1, that shows the median correlation and the standard deviation over 50 train-test combinations on the LIVE-Avvasi Mobile Video Database-Phase 1 in accordance with an embodiment of the present invention.

DETAILED DESCRIPTION

With a goal to thoroughly understand and model the effect of several quality-degrading factors on QoE, a time-varying objective model was designed to accurately predict an end user's QoE. In addition to using previously studied global stall features, such as the length, position, and frequency of stalls, the model of the present invention also captures the recency or hysteresis effect which represents the effect that a viewer's recent level of satisfaction or dissatisfaction has on their overall viewing experience. Towards effectively capturing the complex interactions of these QoE-influencing factors, several useful stall-informative features are extracted and used to design different stall-sensitive input channels. The input channels represent the number of delays, time since the last occurrence of a stall, inverse stall density, and length of the stalls. These waveforms contain useful evidence about the effect of stalls on time-varying QoE. These stall-informative features serve as input channels to a Hammerstein-Wiener (HW) model that captures the hysteresis effect using a linear filter model while accounting for the nonlinearity of human behavior using nonlinear functions at the input of the linear filter. The HW model is trained to accurately predict the QoE scores of videos potentially affected by rebuffering events. The HW model also makes it possible to capture any additional information that influences QoE and model it as an additional "input channel," adding to its elegance. Furthermore, the proposed dynamic system model has a simple structure and is a computationally efficient method of QoE prediction.

The model of the present invention was trained and evaluated on the LIVE-Avvasi Mobile Video Database-Phase 1, which is a large database of reliable subjective opinion scores on 180 videos, distorted by 26 diverse stall patterns. Some of the existing models on the same database were also evaluated and found that the proposed model accurately captures crucial QoE-influencing factors, delivering better prediction performance than all of the compared QoE models.

Figure 1:
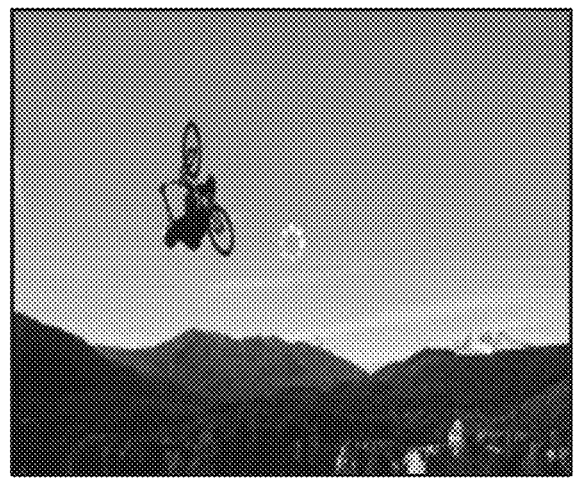
FIG. 1 illustrates an example of a stalling event in a video.
Figure 2:
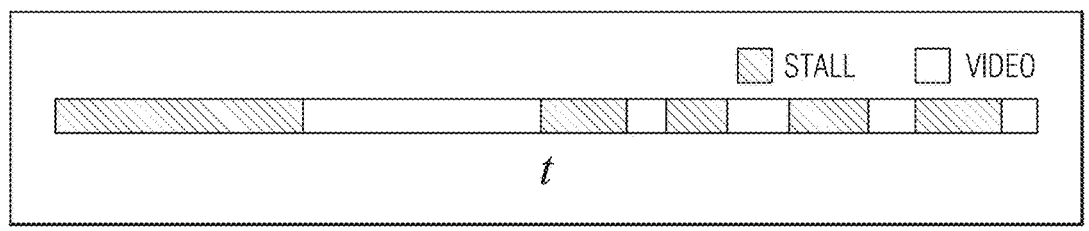
FIG. 2 illustrates an example of various stalling events occurring intermittently in a video.
Figure 3:
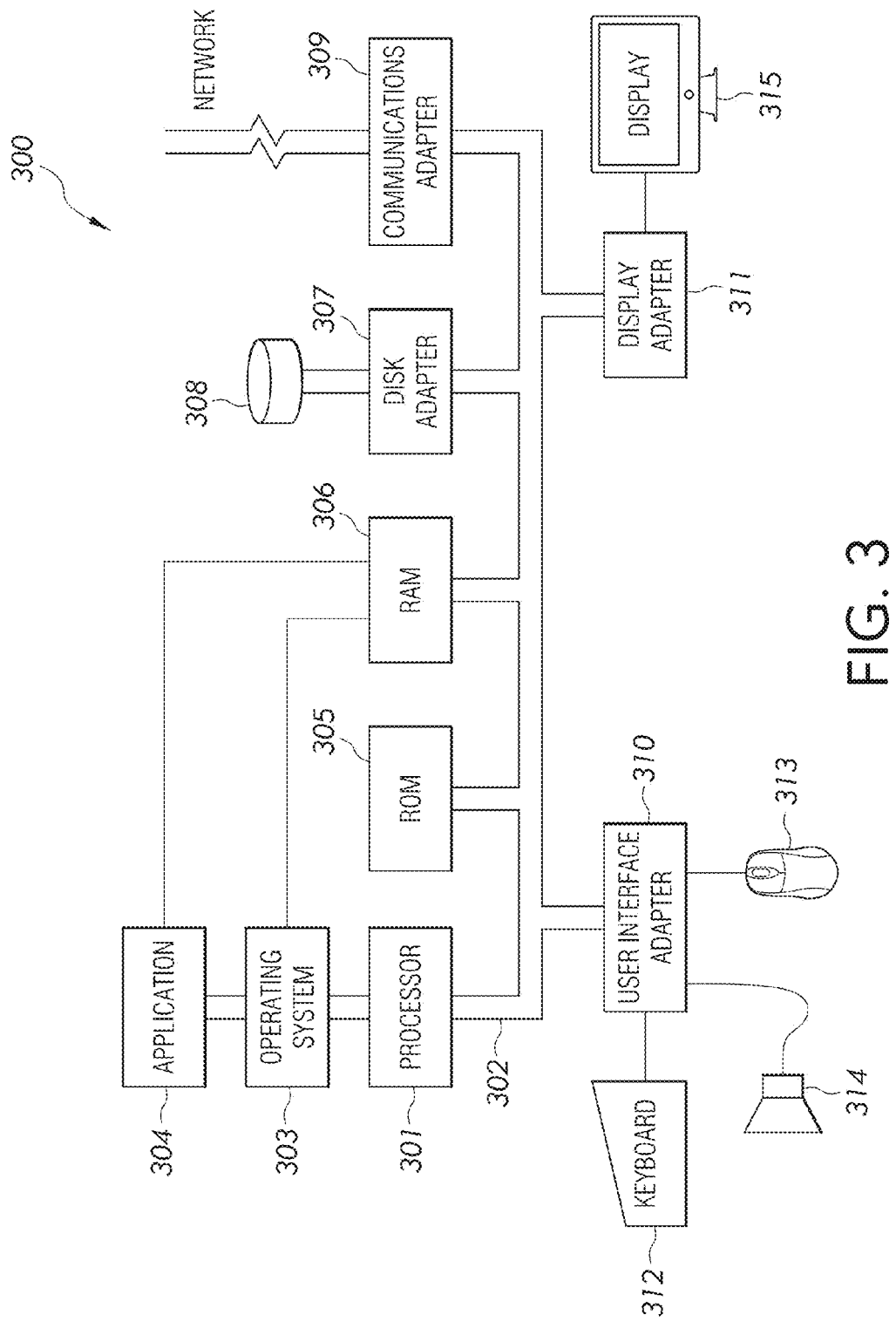
FIG. 3 illustrates a hardware configuration of a computing device which is representative of a hardware environment for practicing the present invention.

Referring now to the Figures in detail, FIG. 3 illustrates a hardware configuration of computing device 300 which is representative of a hardware environment for practicing the present invention. Computing device 300 may be any type of computing device (e.g., portable computing unit, Personal Digital Assistant (PDA), smartphone, laptop computer, mobile phone, navigation device, game console, desktop computer system, workstation, Internet appliance and the like) configured with the capability of predicting a viewer's quality of experience while watching mobile videos potentially afflicted with network induced impairments (e.g., stalls, rebuffering events). Referring to FIG. 3, computing device 300 may have a processor 301 coupled to various other components by system bus 302. An operating system 303 may run on processor 301 and provide control and coordinate the functions of the various components of FIG. 3. An application 304 in accordance with the principles of the present invention may run in conjunction with operating system 303 and provide calls to operating system 303 where the calls implement the various functions or services to be performed by application 304. Application 304 may include, for example, an application for predicting a viewer's quality of experience while watching mobile videos potentially afflicted with network induced impairments (e.g., stalls, rebuffering events) as discussed below in association with FIGS. 4-7.

Referring again to FIG. 3, read-only memory ("ROM") 305 may be coupled to system bus 302 and include a basic input/output system ("BIOS") that controls certain basic functions of computing device 300. Random access memory ("RAM") 306 and disk adapter 307 may also be coupled to system bus 302. It should be noted that software components including operating system 303 and application 304 may be loaded into RAM 306, which may be computing device's 300 main memory for execution. Disk adapter 307 may be an integrated drive electronics ("IDE") adapter that communicates with a disk unit 308, e.g., disk drive. It is noted that the program for predicting a viewer's quality of experience while watching mobile videos potentially afflicted with network induced impairments (e.g., stalls, rebuffering events), as discussed below in association with FIGS. 4-7, may reside in disk unit 308 or in application 304.

Computing device 300 may further include a communications adapter 309 coupled to bus 302. Communications adapter 309 may interconnect bus 302 with an outside network thereby allowing computing device 300 to communicate with other devices.

I/O devices may also be connected to computing device 300 via a user interface adapter 310 and a display adapter 311. Keyboard 312, mouse 313 and speaker 314 may all be interconnected to bus 302 through user interface adapter 310. A display monitor 315 may be connected to system bus 302 by display adapter 311. In this manner, a user is capable of inputting to computing device 300 through keyboard 312 or mouse 313 and receiving output from computing device 300 via display 315 or speaker 314. Other input mechanisms may be used to input data to computing device 300 that are not shown in FIG. 3, such as display 315 having touch-screen capability and keyboard 312 being a virtual keyboard. Computing device 300 of FIG. 3 is not to be limited in scope to the elements depicted in FIG. 3 and may include fewer or additional elements than depicted in FIG. 3.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In prior models of video quality, which deploy established, well-modeled quantitative aspects of visual perception, the recency effect is poorly modeled, as it arises from deeper aspects of human reaction to visually annoying, time-dependent video impairments, such as memory. A number of valuable subjective studies have been conducted with the aim of better understanding the effects of volatile networks on an end user's QoE, on both mobile and desktop devices. The focus in these studies has been to investigate the influence of simple factors, such as startup delays, total stall length, and the number of random video stalls on an end user's QoE. These factors were later used to design a handful of objective QoE models. Certain general conclusions have been reached, such as that longer startup delays and long or frequent stalls are more annoying than shorter ones, and bitrate and number of rebuffering events are highly influential factors for live (sports) content. However, none of these models account for the effects of the complex interactions between stall lengths, frequency of stall occurrence, and the positions of stall events on QoE.

Although the model of the present invention was trained and evaluated on the same database as the delivery quality score (DQS) model, several crucial differences distinguish the approach of the present invention. The DQS model defines three "events," namely start-up delay, first re-buffering, and multiple rebuffering (explicitly). The underlying assumption of the DQS model is that an end user's QoE is driven by these predefined events. Different model parameters are chosen for each event that drives the DQS model's quality prediction, and the predefined events are designed from empirical observations on the opinion scores provided in the LIVE-Avvasi Mobile Video Database-Phase 1. Specifically, the mean and variance of the opinion scores of videos afflicted only by startup delays, or by a startup delay followed by a single (or multiple) rebuffering event(s) are found, and the parameters of their model are determined. Thus, generalizing the DQS model to more diverse stall patterns is difficult. By contrast, the model of the present invention neither requires an explicit definition of any kind of event, nor is it driven by the empirical quality scores provided in the LIVE-Avvasi Mobile Video Database-Phase 1. As previously discussed herein, the flexible architecture of the model of the present invention makes it possible to capture more QoE-influencing features in the future (including spatial and temporal distortions) from videos and model them as additional input channels, allowing for a high degree of generalizability.

When designing a model that can accurately predict perceived QoE, structural simplicity and computational efficiency are also desirable. Moreover, accounting for the effect on viewers' QoE, the hysteresis or recency effect is also important. This behavioral phenomena may be broadly described as the affect that the preceding viewing of a video up to the current moment has on the QoE reported at the current moment. In the absence of such models, temporal system identification tools become useful. In this way, a dynamic model can be created that captures hysteresis effects in human behavioral responses to quality variations using the "memory" of the system state. While a simple linear system model would be desirable, human visual responses contain numerous nonlinearities.

Figure 4:
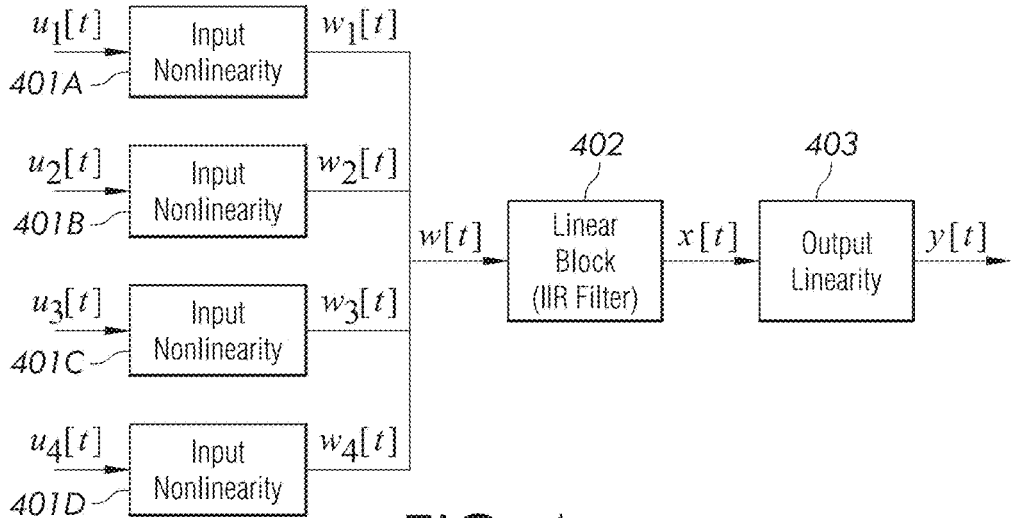
FIG. 4 shows the block diagram of the multiple-input single-output (MISO) Hammerstein-Wiener model that was used in accordance with an embodiment of the present invention.

Towards simultaneously capturing the nonlinearities in human visual responses as well as the hysteresis effect, a classical Hammerstein-Wiener (HW) nonlinear system identification model is employed. The core of the HW model is a linear filter with memory, which is intended to capture the hysteresis effect, with input nonlinearities to capture potential nonlinearities in human behavioral response. This simple design makes it possible to capture both linear and nonlinear aspects of the human visual responses. The output linear scaling block simply scales the output of the linear filter to a quality score. FIG. 4 shows the block diagram of the multiple-input single-output (MISO) Hammerstein-Wiener model that was used in accordance with an embodiment of the present invention.

The linear filter block of the model of the present invention (See FIG. 4) has the following form:

$$x[t] = \sum_{d=0}^{n_b} b_d w[t-d] + \sum_{d=1}^{n_f} f_d x[t-d] \quad (1)$$
$$= b^T(w)_{t-n_b:t} + f^T(x)_{t-n_f:t-1},$$

where $w[t]$ is the aggregate of the outputs of the four nonlinear input blocks 401A-401D at time t. Nonlinear input blocks 401A-401D may collectively or individually be referred to as nonlinear input blocks 401 or nonlinear input block 401, respectively. The parameters $n_b$ and $n_f$ define the model order, while the coefficients $b=(b_1, \ldots, b_{nb})^T$ and $f=(f_1, \ldots, f_{nf})^T$ are learned.

A generalized sigmoid function is used at the inputs: each input nonlinear block 401A-401D is of the form $$w_i[t] = \beta_{i,3} + \beta_{i,4} \frac{1}{1 + \exp(-(\beta_{i,1} u_i[t] + \beta_{i,2}))}, \quad (2)$$

while the output block 403, which scales the output of the linear IIR filter 402 to a QoE score, is a simple linear function of the form $$y[t] = \gamma_2 w[t] + \gamma_2, \quad (3)$$

where $\beta = (\beta_{i,1} \ldots, \beta_{i,4})^T$ for $i=1, \ldots, 4$, and $\gamma = (\gamma_1, \gamma_2)^T$ are also trained.

It is noted that the input nonlinearity blocks 401 and output linearity block 403 are not restricted to the sigmoid or linear functions forms presented. The input and output blocks in the model may be other suitable linear or nonlinear functions, such as, but not limited to, linear, piecewise linear, sigmoid, polynomial, or custom designed or learned functions. Additionally, blocks 401A, 401B, 401C, 401D and 403 may all have different functional forms.

The salient aspects of the new LIVE-Avvasi Mobile Video Database-Phase 1 that was used to train the QoE model of the present invention are now briefly described.

To facilitate the design of generalizable QoE prediction models of mobile video QoE that account for the influence of diverse, realistic stalling patterns on a user's QoE, a new mobile video database called the LIVE-Avvasi Mobile Video Database-Phase 1 was recently proposed. The new database incorporates diverse, varying QoE-influencing parameters, such as the position, frequency, and length of video stalls. The database contains 180 distorted videos that were generated by simulating 26 unique stalling events and startup delays on 24 high-quality reference videos. These 24 video sequences contain varied video content that are divided into five categories: sports (9), talk shows and documentaries (8), music (2), commercials (3), and newscasts (2). A large-scale subjective study was conducted on these videos displayed on mobile devices and hence each video has an associated ground truth mean QoE subjective score.

The four videos that were used in the training phase of the subjective study were excluded. The reference videos were also excluded when training and evaluating the model of the present invention.

A previous statistical analysis revealed the impact of several factors on QoE: it was found that the frequency of occurrence of stalls, their positions, and their lengths have a more serious impact on an end user's QoE than factors, such as motion and total video length. More specifically, longer, more frequent stalls have a significant impact on a user's QoE. With a goal towards modeling these stall properties, four stall-descriptive input channels were designed as described below in connection with FIGS. 4-6.

Figure 5:
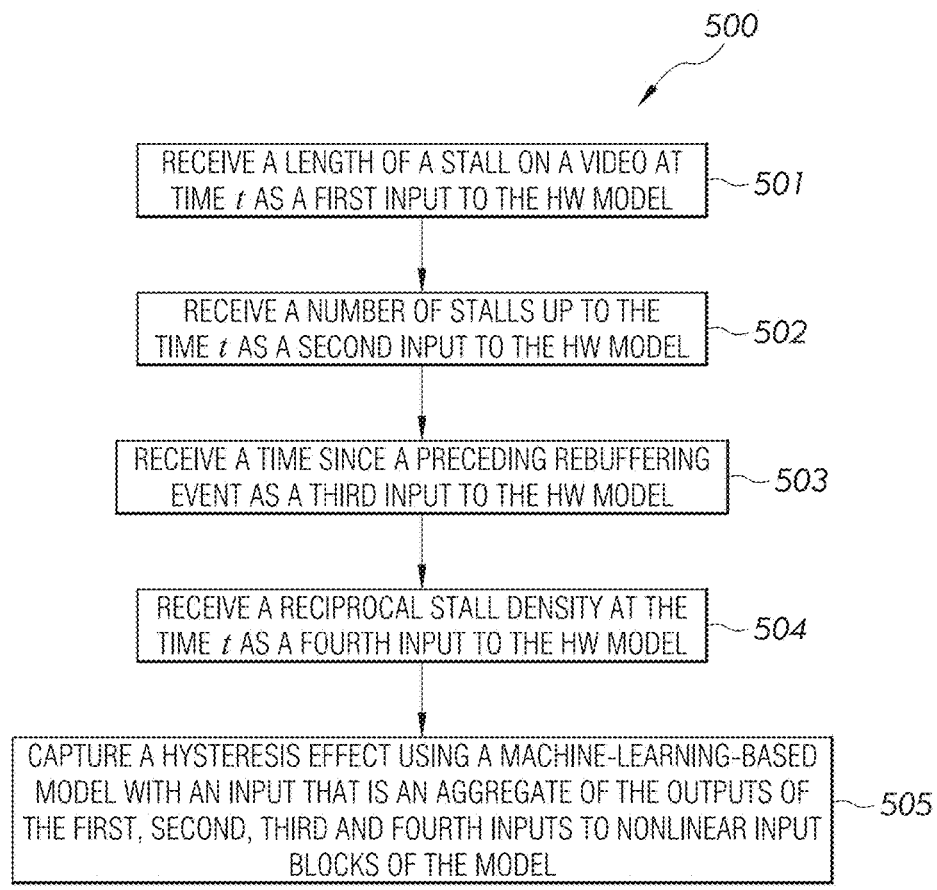
FIG. 5 is a flowchart of a method for predicting a viewer's quality of experience while watching mobile videos potentially afflicted with network induced impairments in accordance with an embodiment of the present invention.
Figure 6:
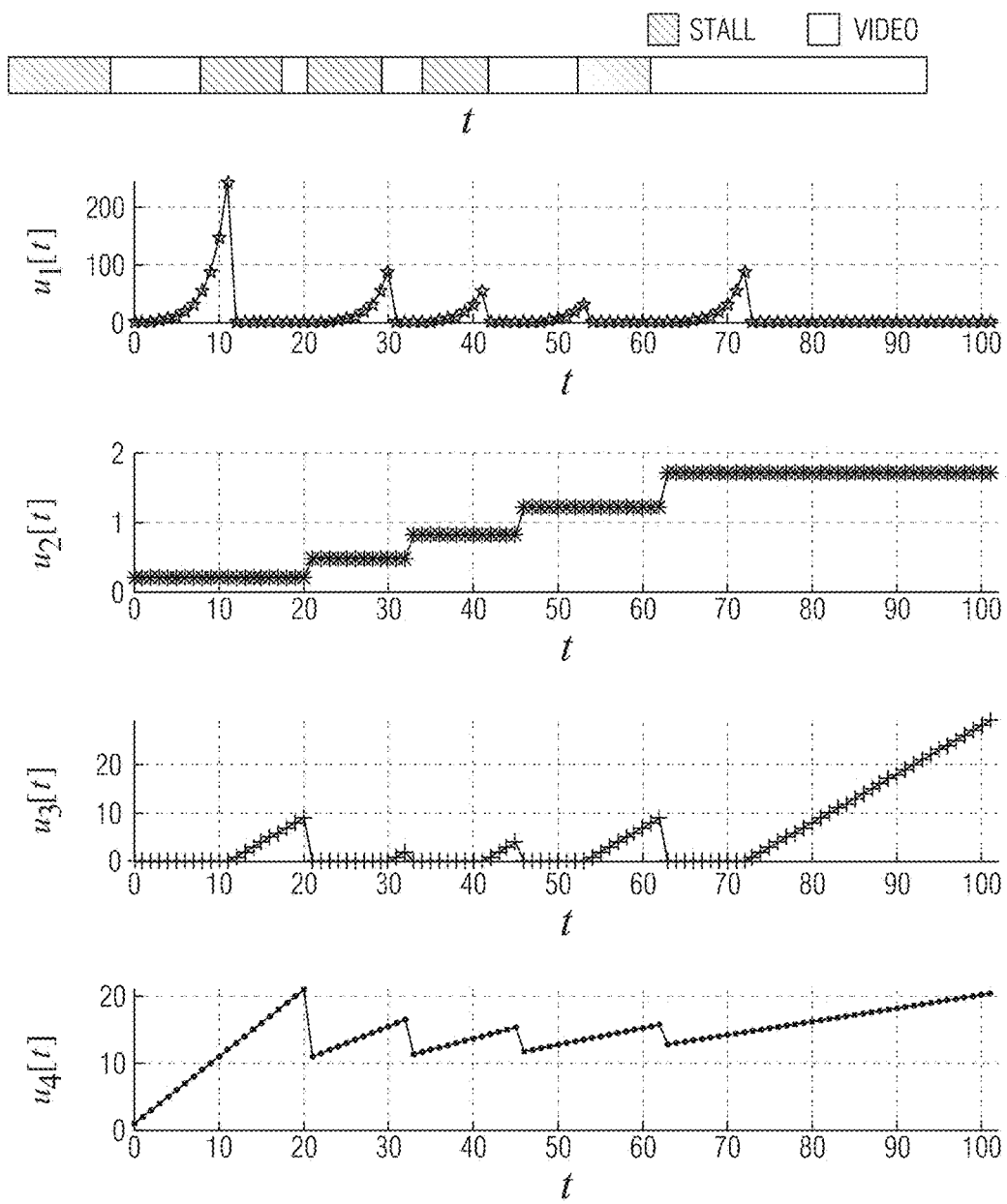
FIG. 6 illustrates the channels serving as inputs to the Hammerstein-Wiener (HW) model in accordance with an embodiment of the present invention.

As discussed above, FIG. 4 shows the block diagram of the multiple-input single-output (MISO) Hammerstein-Wiener model that was used in accordance with an embodiment of the present invention. FIG. 5 is a flowchart of a method 500 for predicting a viewer's quality of experience while watching mobile videos potentially afflicted with network induced impairments in accordance with an embodiment of the present invention. FIG. 6 illustrates the channels serving as inputs to the HW model in accordance with an embodiment of the present invention.

Referring to FIG. 5, in conjunction with FIGS. 1-4 and 6, in step 501, computing device 300 receives a length of a stall on a video at time t as a first input to the HW model.

The first input channel ($u_1[t]$) is designed to capture the impact of stall lengths on QoE. Given a video, if $s_1[t]$ denotes length of a stall at time t, then let $$u_1[t] = \varepsilon^{\alpha_1 s_1[t]} - 1, \quad (4)$$

where $\alpha_1$ is a scalar chosen via cross-validation. The choice of a nonlinear exponential function to express the influence of stall length on predicted QoE is motivated by the notion that annoyance increases with rebuffering length.

In step 502, computing device 300 receives a number of stalls up to the time t as a second input to the HW model.

In one embodiment, it is aimed to model the impact of the number of stalls on QoE. As a result, another input channel ($u_2[t]$) is defined as below $$u_2[t] = \varepsilon^{\alpha_2 s_2[t]} - 1, \quad (5)$$

where $s_2[t]$ is the total number of stalls up to time t. Nonlinearly mapping the number of delays reflects the idea that a viewer's annoyance increases exponentially with the number of times a video stalls.

In step 503, computing device 300 receives a time since a preceding rebuffering event as a third input to the HW model.

The next input channel targets recency. As the period of time following a stall increases, the viewer's perceived QoE may reflect improved satisfaction with the streaming video quality. However, immediately (and for some period of time) following a stall, the viewer's perceived QoE should reflect heightened annoyance with the streaming quality. Thus, the third input ($u_3[t]$) to the model is the time since the preceding rebuffering event, with values of zero representing times during stalls. If $[T_{1,end}, T_{2,begin}]$ denotes the interval between the stall event ending at time $T_{1,end}$ and the next stall event starting at time $T_{2,begin}$, then $$u_3[t] = \begin{cases} t - T_{1,end} & \text{if } [T_{1,end} \leq t < T_{2,begin}] \\ 0 & \text{if } [T_{1,begin} \leq t < T_{1,end}] \end{cases}. \quad (6)$$

In step 504, computing device 300 receives a reciprocal stall density at the time t as a fourth input to the HW model.

The final input ($u_4[t]$) is the reciprocal stall density at time t, which provides a way of accounting for the length of the video relative to the total number of stall events that have occurred. The inverse stall density is simply time t divided by the number of rebuffering events in the video up to time t:

$$u_4[t] = \frac{t}{s_2[t]}. \quad (7)$$

As mentioned previously, a stall event that occurs near the end of a long video containing few previous stalls will likely impact a viewer's QoE more than if that stall event occurred near the middle or at the beginning of the video. The inverse stall density adds a normalized time factor to the model of the present invention.

While the foregoing discusses receiving a length of a stall on a video at time t; receiving a number of stalls up to the time t; receiving a time since a preceding rebuffering event; and receiving a reciprocal stall density at the time t as inputs to the model, other inputs may be inputted to the model, such as, but not limited to, spatial and temporal distortions, a telecommunication buffer status (e.g., status of the router's physical memory storage used to temporarily store data) and a network status (e.g., status of network traffic). These other inputs may either replace one or more of the previously listed inputs or be used in addition to the previously listed inputs to capture a hysteresis effect as discussed below. Furthermore, these other inputs may also be used to predict QoE.

In step 505, computing device 300 captures a hysteresis effect using a machine-learning-based model (e.g., linear filter, such as IIR filter 402) with an input that is an aggregate of the outputs of the first, second, third and fourth inputs to nonlinear input blocks 401 of the HW model. As discussed above, the hysteresis effect represents an effect that a viewer's recent level of satisfaction or dissatisfaction has on their overall viewing experience. The principles of the present invention may utilize other types of machine-learning-based models, including, but not limited to, a support vector regressor, a random forest regressor, and a deep machine learning model. A person of ordinary skill in the art would be capable of applying the principles of the present invention to such implementations. Further, embodiments applying the principles of the present invention to such implementations would fall within the scope of the present invention.

Furthermore, the scope of the present invention is to include any machine learning algorithm now known or developed in the future that is capable of performing the functionality of IIR filter 402 as discussed herein.

All of these channels ($u_1[t]$, $u_2[t]$, $u_3[t]$ and $u_4[t]$) serve as inputs to the HW model as illustrated in FIG. 6 in accordance with an embodiment of the present invention.

With respect to the output to the model, each distorted video in the LIVE-Avvasi Mobile Video Database-Phase 1 is associated with a single mean opinion score captured by aggregating opinion scores from many subjects. Specifically, the study framework was designed, such that at the end of the presentation of each video sequence, a rating page was displayed on the screen with a continuous scale slider, allowing users to provide a single rating that accurately reflects their overall viewing experience.

However, training a Hammerstein-Weiner model requires continuous-time quality score waveforms. The lack of ground truth continuous-time subjective scores corresponding to the videos in the LIVE-Avvasi Mobile Video Database-Phase 1 posed a challenge in building the model of the present invention. To address the need for a dynamic subjective QoE, time-varying output waveforms were designed based on the DQS model, and the predicted waveforms were scaled to exactly predict the ground truth human subjective scores. Though the performance of the continuous waveforms generated by the DQS model cannot be validated due to the lack of ground truth waveforms, the final video quality scores predicted by the DQS model correlate reasonably well with human opinion scores. These continuous waveforms were only used to train the HW model. Once trained, the HW model accurately predicts continuous time-varying QoE values on test videos.

In all of the experiments, the video data was randomly divided into disjoint 80% training and 20% test subsets. To mitigate any bias due to the division of data, the process of randomly splitting the dataset was repeated 50 times. Spearman Rank Ordered Correlation Coefficients (SROCC) and Pearson Linear Correlation Coefficients (PLCC) between the predicted and the ground truth quality scores were computed at the end of each iteration. The median correlation and the standard deviation over these 50 iterations are reported in Table 1 as shown in FIG. 7 in accordance with an embodiment of the present invention. Higher correlation values indicate better performance of a QoE prediction model in terms of monotonicity and linear accuracy.

To find the optimal HW QoE prediction model, the model order parameters ($n_b$, $n_f$, b, f, $\beta_i$, $\gamma$) and the input nonlinearities were determined via cross-validation. Performing a simple grid-search resulted in the values $n_b=4$ and $n_f=3$ being chosen as the final model parameters. The values of the weights $\alpha_1$ and $\alpha_2$ in (4) and (5) were determined using cross-validation. Specifically, a grid search varying both scalars between 0.1 and 0.7 in steps of 0.1 was performed along with training a series of models using the training data and evaluating the performance of each on the test data. Furthermore, scenarios where both the inputs are linear, i.e., ($u_1[t]=s_1[t]$), or when one of the two inputs is linear and the other is exponential were experimented. The model with nonlinear inputs and with $\alpha_1=0.5$ and $\alpha_2=0.2$ yielded maximum correlation scores and was thus chosen as the final model.

A few other QoE-prediction models were trained on the LIVE-Avvasi Mobile Video Database-Phase 1 using the same training and testing splits. The median correlations computed across the 50 splits is reported in Table 1 of FIG. 7, from which may be concluded that the performance of the model of the present invention on unseen test data is significantly better than those of current top-performing models.

Dynamic stalling prediction models, such as the Hammerstein-Wiener model developed here to predict QoE, are potentially advantageous both in terms of performance and the flexibility to modify it in the future. The model of the present invention uses four input channels descriptive of rebuffering patterns in video streaming. The model is flexible enough to allow for additional input channels that are descriptive of other QoE factors, such as spatial and temporal distortions.

As discussed herein, the principles of the present invention present a stall-specific video quality assessment algorithm that effectively captures the effect of several QoE-influencing parameters, which models hysteresis, and accurately predicts viewers' overall quality of experience.

In particular, the present invention automatically predicts a viewer's quality of experience while watching mobile videos potentially afflicted with network induced impairments, such as stalls and rebuffering events. In one embodiment, the present invention is a perceptual model that also incorporates memory to model the recency effect or hysteresis. The recency effect is the idea that a viewer's recent levels of satisfaction while watching a video will impact their current level of satisfaction, and thus, will also impact their determination of quality. No previous models for predicting QoE as affected by stalls and rebuffering events incorporate memory. Additionally, no previous models are perceptually based.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for predicting a viewer's quality of experience while watching mobile videos potentially afflicted with network induced impairments, the method comprising:

receiving a length of a stall on a video at time t as a first input to a model;

receiving a number of stalls up to said time t as a second input to said model;

receiving a time since a preceding rebuffering event as a third input to said model;

receiving a reciprocal stall density at said time t as a fourth input to said model, wherein said reciprocal stall density accounts for a length of said video relative to said number of stalls that have occurred;

capturing, by a processor, a hysteresis effect using a machine-learning-based model with an input that is an aggregate of the outputs of said first, second, third and fourth inputs to nonlinear input blocks of said model, wherein said hysteresis effect represents an effect that a viewer's recent level of satisfaction or dissatisfaction has on their overall viewing experience;

utilizing waveforms to train said model, wherein said waveforms are scaled to predict ground truth human subjective scores; and predicting said viewer's quality of experience using said captured hysteresis effect.

2. The method as recited in claim 1 further comprising:
accounting for nonlinearity of human behavior using nonlinear functions at an input of said machine-learning-based model.

3. The method as recited in claim 2 further comprising:
scaling an output of said machine-learning-based model to a quality score.

4. The method as recited in claim 1 further comprising:
training said model using a database containing distorted videos that were generated by simulating stalling events and startup delays.

5. The method as recited in claim 4, wherein each of said distorted videos is associated with a ground truth mean quality of experience subjective score.

6. The method as recited in claim 1 further comprising:
receiving information pertaining to spatial and temporal distortions as a fifth and a sixth input to said model.

7. The method as recited in claim 1, wherein said model is a Hammerstein-Wiener model.

8. The method as recited in claim 1, wherein said reciprocal stall density corresponds to said time t divided by a number of rebuffering events in said video up to said time t.

9. The method as recited in claim 1, wherein said machine-learning-based model is a linear filter.

10. The method as recited in claim 1, wherein said machine-learning-based model is one of the following: a support vector regressor, a random forest regressor, and a deep machine learning model.

11. The method as recited in claim 1 further comprising:
receiving one or more of the following as further inputs to said model: a telecommunication buffer status and a network status.

12. A computer program product for predicting a viewer's quality of experience while watching mobile videos potentially afflicted with network induced impairments, the computer program product comprising a computer readable storage medium having program code embodied therewith, the program code comprising the programming instructions for:

receiving a length of a stall on a video at time t as a first input to a model;

receiving a number of stalls up to said time t as a second input to said model;

receiving a time since a preceding rebuffering event as a third input to said model;

receiving a reciprocal stall density at said time t as a fourth input to said model, wherein said reciprocal stall density accounts for a length of said video relative to said number of stalls that have occurred;

capturing a hysteresis effect using a machine-learning-based model with an input that is an aggregate of the outputs of said first, second, third and fourth inputs to nonlinear input blocks of said model, wherein said hysteresis effect represents an effect that a viewer's recent level of satisfaction or dissatisfaction has on their overall viewing experience;

utilizing waveforms to train said model, wherein said waveforms are scaled to predict ground truth human subjective scores; and predicting said viewer's quality of experience using said captured hysteresis effect.

13. The computer program product as recited in claim 12, wherein the program code further comprises the programming instructions for:

accounting for nonlinearity of human behavior using nonlinear functions at an input of said machine-learning-based model.

14. The computer program product as recited in claim 13, wherein the program code further comprises the programming instructions for:

scaling an output of said machine-learning-based model to a quality score.

15. The computer program product as recited in claim 12, wherein the program code further comprises the programming instructions for:

training said model using a database containing distorted videos that were generated by simulating stalling events and startup delays.

16. The computer program product as recited in claim 15, wherein each of said distorted videos is associated with a ground truth mean quality of experience subjective score.

17. The computer program product as recited in claim 12, wherein the program code further comprises the programming instructions for:

receiving information pertaining to spatial and temporal distortions as a fifth and a sixth input to said model.

18. The computer program product as recited in claim 12, wherein said model is a Hammerstein-Wiener model.

19. The computer program product as recited in claim 12, wherein said reciprocal stall density corresponds to said time t divided by a number of rebuffering events in said video up to said time t.

20. The computer program product as recited in claim 12, wherein said machine-learning-based model is a linear filter.

21. The computer program product as recited in claim 12, wherein said machine-learning-based model is one of the following: a support vector regressor, a random forest regressor, and a deep machine learning model.

22. The computer program product as recited in claim 12, wherein the program code further comprises the programming instructions for:

receiving one or more of the following as further inputs to said model: a telecommunication buffer status and a network status.

23. A system, comprising:

a memory unit for storing a computer program for predicting a viewer's quality of experience while watching mobile videos potentially afflicted with network induced impairments; and a processor coupled to the memory unit, wherein the processor is configured to execute the program instructions of the computer program comprising:

receiving a length of a stall on a video at time t as a first input to a model;

receiving a number of stalls up to said time t as a second input to said model;

receiving a time since a preceding rebuffering event as a third input to said model;

receiving a reciprocal stall density at said time t as a fourth input to said model, wherein said reciprocal stall density accounts for a length of said video relative to said number of stalls that have occurred;

capturing a hysteresis effect using a machine-learning-based model with an input that is an aggregate of the outputs of said first, second, third and fourth inputs to nonlinear input blocks of said model, wherein said hysteresis effect represents an effect that a viewer's recent level of satisfaction or dissatisfaction has on their overall viewing experience;

utilizing waveforms to train said model, wherein said waveforms are scaled to predict ground truth human subjective scores; and predicting said viewer's quality of experience using said captured hysteresis effect.

24. The system as recited in claim 23, wherein the program instructions of the computer program further comprise:

accounting for nonlinearity of human behavior using nonlinear functions at an input of said machine-learning-based model.

25. The system as recited in claim 24, wherein the program instructions of the computer program further comprise:

scaling an output of said machine-learning-based model to a quality score.

26. The system as recited in claim 23, wherein the program instructions of the computer program further comprise:

training said model using a database containing distorted videos that were generated by simulating stalling events and startup delays.

27. The system as recited in claim 26, wherein each of said distorted videos is associated with a ground truth mean quality of experience subjective score.

28. The system as recited in claim 23, wherein the program instructions of the computer program further comprise:

receiving information pertaining to spatial and temporal distortions as a fifth and a sixth input to said model.

29. The system as recited in claim 23, wherein said model is a Hammerstein-Wiener model.

30. The system as recited in claim 23, wherein said reciprocal stall density corresponds to said time t divided by a number of rebuffering events in said video up to said time t.

31. The system as recited in claim 23, wherein said machine-learning-based model is a linear filter.

32. The system as recited in claim 23, wherein said machine-learning-based model is one of the following: a support vector regressor, a random forest regressor, and a deep machine learning model.

33. The system as recited in claim 23, wherein the program instructions of the computer program further comprise:

receiving one or more of the following as further inputs to said model: a telecommunication buffer status and a network status.

* * * * *